United States Patent [19]

Clark et al.

[11] Patent Number: 4,611,327
[45] Date of Patent: Sep. 9, 1986

[54] GAS TRANSPORT LASER SYSTEM

[75] Inventors: David J. Clark, Atherton; Theodore S. Fahlen, San Jose, both of Calif.

[73] Assignee: Amoco Corporation, Chicago, Ill.

[21] Appl. No.: 555,239

[22] Filed: Nov. 25, 1983

[51] Int. Cl.[4] .......................... H01S 3/02; H01S 3/097
[52] U.S. Cl. ........................................ 372/58; 372/57; 372/86; 372/90
[58] Field of Search ....................... 372/58, 57, 89, 90, 372/86

[56] References Cited

U.S. PATENT DOCUMENTS

| 4,077,108 | 2/1978 | Fahlen et al. | 372/86 |
| 4,134,083 | 1/1979 | Sasnett et al. | 372/90 |
| 4,156,208 | 5/1979 | Sasnett | 372/86 |

Primary Examiner—James W. Davie
Attorney, Agent, or Firm—Townsend and Townsend

[57] ABSTRACT

A high average power, high repetition rate pulsed gas transport laser system is disclosed. A pulse forming network location for minimizing electrical discharge loop inductance is provided. RFI shielding is included as a result of containment of the pulse forming network housed in a dielectric structure eccentrically mounted within a pressurizable vessel and forming a portion of a high-speed gas flow loop. The gas recirculating blower motor is mounted external to the pressurizable vessel and, therefore, does not add to the laser system dimensions. The blower is coupled to the blower motor by a magnetic coupling. Blower speed and power can be changed readily. Corona or cold-cathode X-ray preionization is provided in order to provide arc-free gas discharge. Materials compatible with the laser gases are used in construction. The laser system is configured to be compact, to be easily maintainable, and to be readily adapted for laser industrial processing. Output of the laser system is at least 100 watts at a pulse repetition frequency of 500 Hz with a xenon chloride (XeCl) polyatomic excimer molecule as the laser medium. Other features are also disclosed.

52 Claims, 6 Drawing Figures

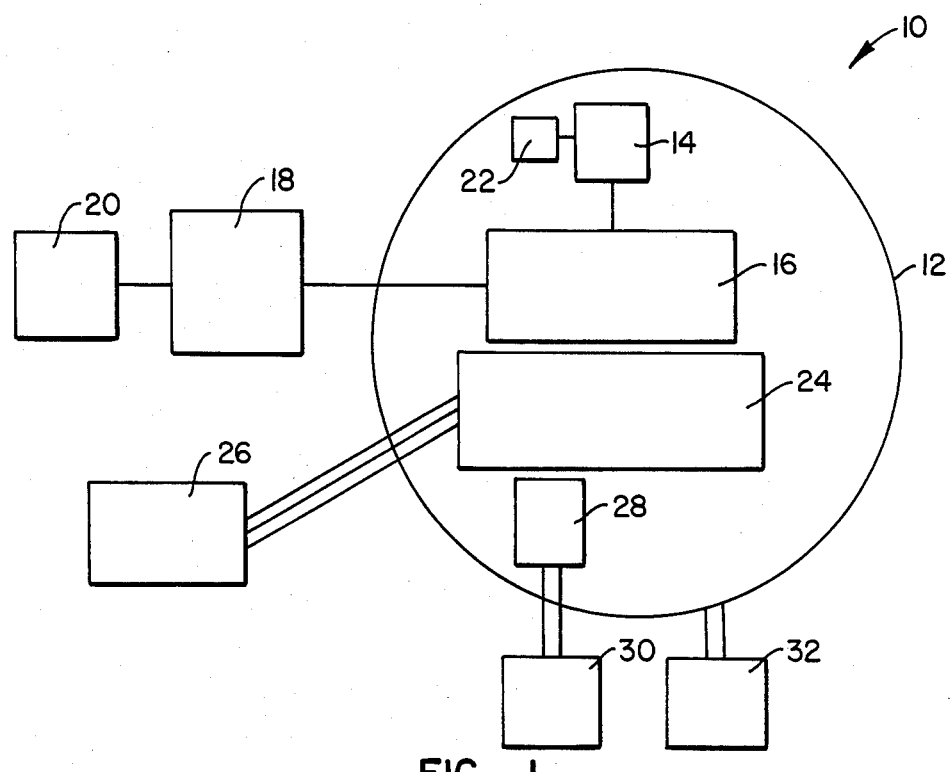
FIG._1.
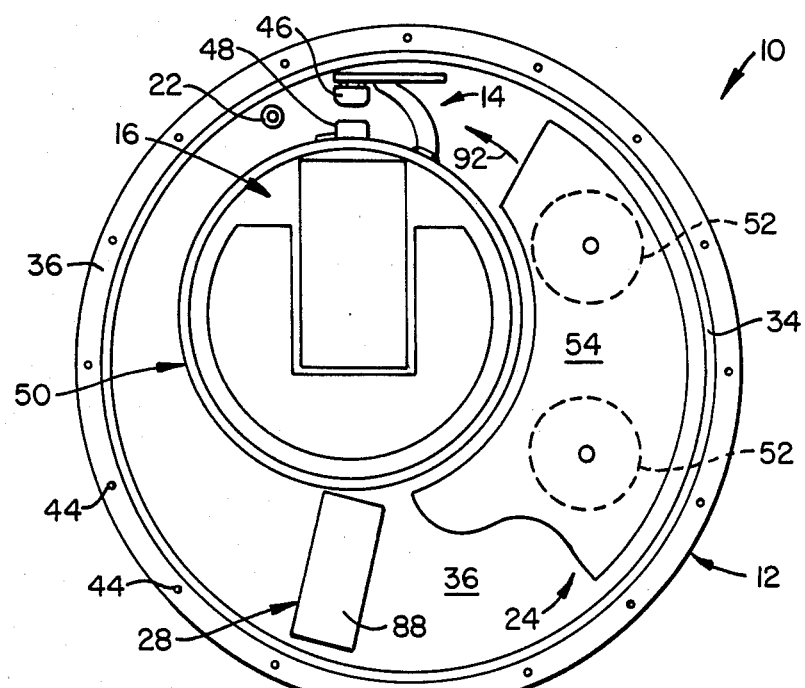
FIG._3.

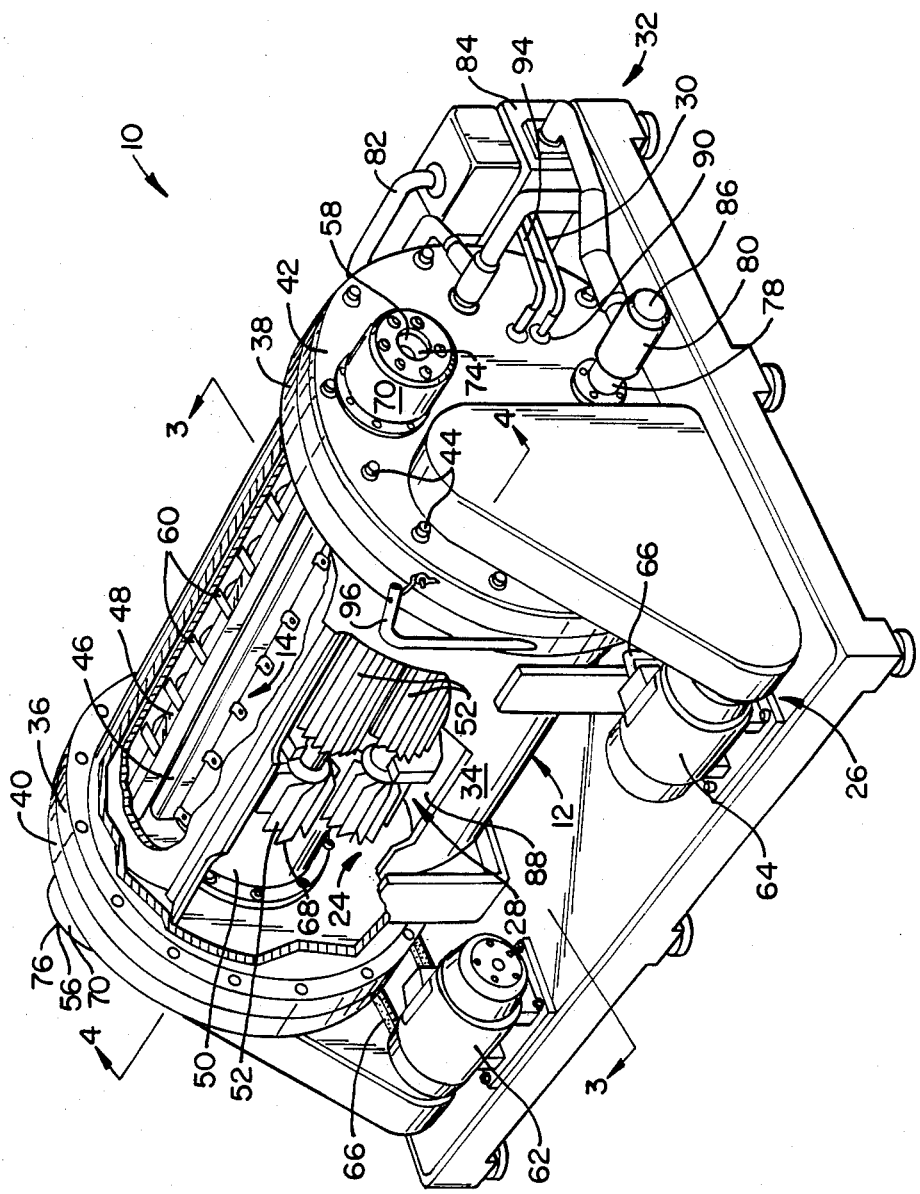
FIG._2.

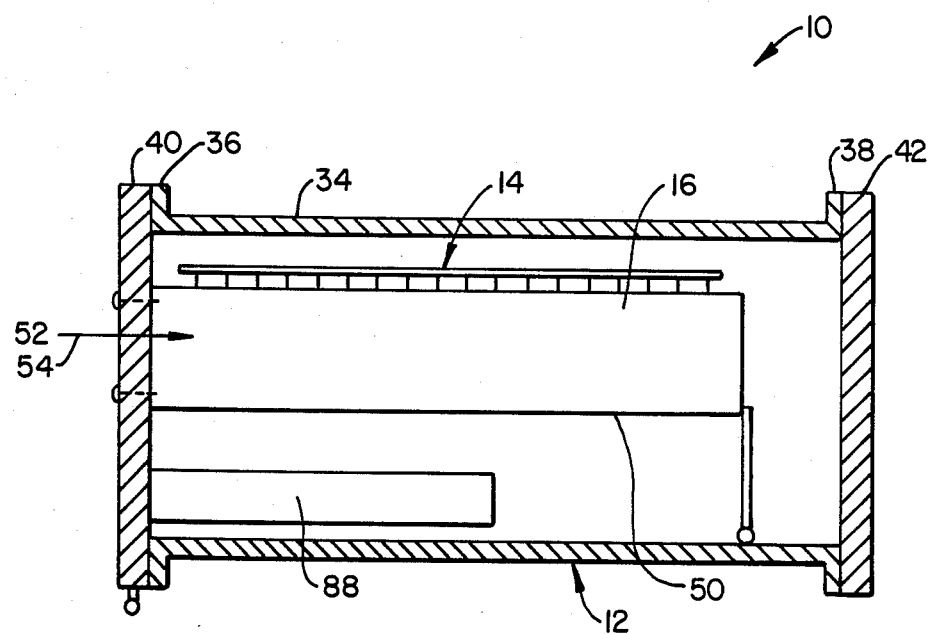
FIG._4.

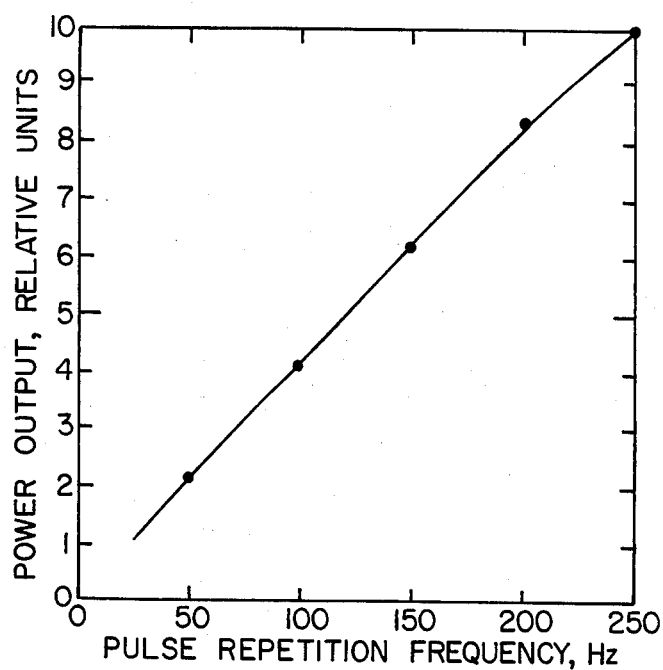
FIG._5.
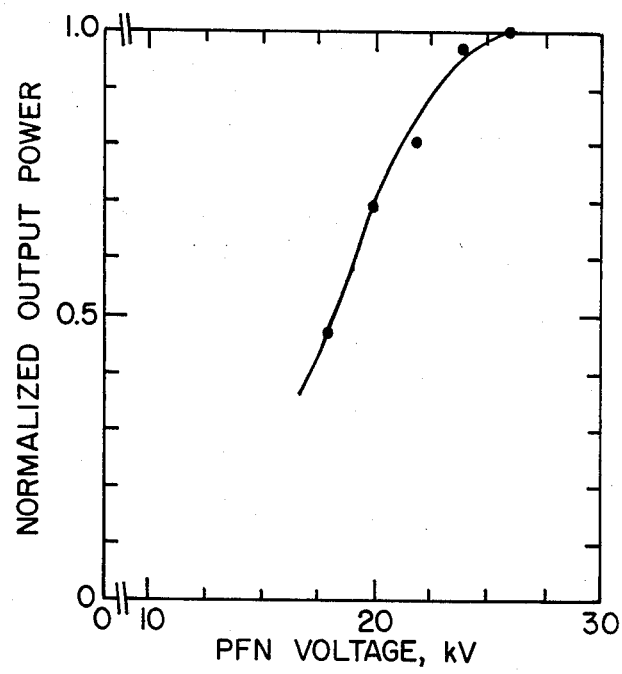
FIG._6.

GAS TRANSPORT LASER SYSTEM

BACKGROUND OF THE INVENTION

This invention relates to gas lasers wherein a gas or mixture of gases is excited to form a laser medium which can produce or amplify coherent radiation. More particularly, the invention is directed to gas transport lasers, including pulsed gas transport lasers.

In order to facilitate an understanding of the invention, the invention will be described by way of example in connection with excimer lasers. The invention is directed especially to excimer lasers in which the laser medium is an excimer molecule because the pressures and temperatures, as well as the nature of the gases, encountered in excimer lasers render them difficult to implement structurally and operate for extended periods. The exemplary use of the invention in connection with excimer lasers, however, is by way of illustration only and is not to be interpreted as a limitation of the principles of the invention to excimer lasers. As will become clear, the principles which underlie the invention apply generally to other types of gas transport lasers with less demanding structural requirements and operating characteristics than excimer lasers.

Excimers are molecules formed from two species of atoms or molecules when one (or both) of them is raised to an electronically excited state so that they can combine to form an excited molecule. The reaction is promoted by the presence of a chemically inert substance which removes energy from a colliding pair of atoms or molecules of the different species to produce the excimer molecule. The excimer molecule is an unbound or only very weakly bound molecule in the ground state. This excimer molecule emits radiation at a particular characteristic laser wavelength when it returns to the ground state, the wavelength of the emission from the excimer molecule which is formed being determined from the energetics of the physical system (i.e., the energy difference between the metastable and the ground state of the excimer molecule). Inasmuch as the excimer molecule exists only briefly in the ground state, after formation of the excimer molecule and subsequent emission of radiation, the atoms or molecules return to their original species.

One known type of excimer laser includes a polyatomic excimer laser medium consisting of rare gas atoms and molecules of reactant, which undergo bonding interactions, when the rare gas atoms are excited to metastable states. The molecules of reactant which react with the rare gas atoms, for example, can be monohalide molecules, which react in bimolecular reactions to form the polyatomic excimer. Since the rare gas and monohalide molecules generally return to their original species after each cycle of excitation, emission, and return to ground state, reaction products in the laser chamber are generally eliminated at the conclusion of each cycle.

Detailed descriptions of excimer lasers are found in the literature. See, for example, the article by J. J. Ewing, "Review of UV Excimer Lasers," Ultra High Power Lasers, SPIE, Vol. 76, 1976, pages 132–143, and the bibliographical references cited in the article, hereby incorporated by reference herein.

An important consideration relative to gas lasers is the cleanliness of the laser gases. In order to achieve long-life operation with one laser gas fill, it is necessary to prevent the gas or mixture of gases from becoming contaminated.

However, the existence of highly active reactants is a serious difficulty, especially in rare gas monohalide excimer lasers which use fluorine, chlorine, bromine, or iodine. Not only are the halogens highly reactive and difficult to handle with safety, but residual reaction products caused by contact of halogens with structural materials result in absorbing or scattering species, including particulates, which limit life in rare gas monohalide excimer lasers. It is highly desirable that the gas mixture not come into contact with any material which can form volatile or particulate compounds in the presence of the laser gases. Otherwise, undesired reaction products can be present which deteriorate the gas mixture, reducing its life or requiring circulation or flow of clean gas mixture through the laser chamber. Furthermore, difficulty has been experienced in rendering the laser chamber which contains the gas mixture leak tight.

Contamination of the gas mixture and leakage can reduce the period of operation of known excimer lasers to unacceptably short times. The present invention provides a gas transport laser system in which formation of reaction products which contaminate the gas mixture and leakage of the laser gases are minimized.

Additionally, difficulty has arisen in pulsed gas transport lasers in connection with exciting laser gases to produce lasing action, such as by pulsed electrical discharges. In order to produce a reliable high average power excimer laser, for example, various criteria must be met. One criterion is that in an electrically excited excimer laser, the electrical discharge forming network must be capable of providing high current, high voltage pulses at high pulse rates over a large number of pulses without degradation or failure. In addition, the electrical discharge forming network must be capable of providing a large current rise time (dI/dt). The combined requirements on the electrical discharge forming network components of high average power, for example, high current rise time ($\approx 10^{11}$ A/sec), high voltage ($\approx 50$ KV), high average input power ($\approx 5$ KW), relatively high pulse rates ($\approx 500$ Hz), and long life, makes implementation of the electrical discharge forming network difficult.

If the current rise time across the laser electrodes is an appreciable fraction of the electrical discharge pulse duration, however, the electrical discharge forming network can only deliver a small fraction of its stored energy to the gas mixture. The current rise time can be limited by the inductance of the laser electrical discharge current loop which includes the laser electrodes. In known excimer lasers, residual circuit inductance has dominated the current rise time.

Unfortunately, a competing requirement in a high pulse rate excimer laser is to clear the gas mixture from between the electrodes in a time short compared to the interpulse period in order to obtain a uniform electrical discharge. In known fast flow excimer lasers, the gas flow between the electrodes is in a sheet perpendicular to the plane of the electrical discharge. The discharge products and heated gas mixture are carried downstream into the current return conductor. This necessitates repositioning the downstream current return conductor and accompanying insulator so that they are farther from the electrodes, thereby increasing the inductance of the electrical discharge loop, which adversely affects the current rise time.

A low electrical discharge loop inductance is critical in obtaining a uniform, efficient gas discharge. The gas transport laser system in accordance with the present invention minimizes the inductance of the electrical discharge loop.

Furthermore, the gas clearing ratio (i.e., the ratio of the distance the gas mixture travels between electrical discharge pulses to the electrode width in the gas flow direction) must be greater than one. If the clearing ratio, which is typically three to five, in a transverse gas flow geometry is not sufficient, then the electrical discharge tends to follow a path through the hot gas of the previous cycle and not between the electrodes.

In addition, the use of insulation along the current return conductor is limited. The current return conductor and associated insulation must present minimal resistance to the gas flow in order to minimize the power consumed by the blower motor. Also, the upstream conductor must be configured so as to not produce gas density variations (wakes or vortices) in the gas mixture between the electrodes, as this produces electrical discharge non-uniformity.

One embodiment of the gas transport laser system in accordance with the present invention provides a gas flow configuration which can avoid the aforementioned gas flow difficulties. At the same time, the inductance of the electrical discharge loop is minimized.

Another criterion is that in order to obtain efficient, stable operation with minimal electrode wear, a uniform electrical discharge must be produced. Many known excimer lasers incorporate an array of spark sources to produce ultraviolet radiation for preionizing the gas mixture. The spark source has several disadvantages. Firstly, the fact that sparks are used means that some spark electrode erosion occurs. This limits the life of the spark source through physical erosion and the life of the gas mixture through introduction of contaminants. Furthermore, a separate energy source and electrical discharge forming components are required to generate the sparks. Also, a separate circuit is required in order to provide the correct delay between the spark source discharge and the main electrical discharge. Additionally, the ultraviolet radiation produced floods the entire discharge area. The resulting preionization near the electrode edges makes it necessary to contour the edges in order to prevent arc formation there.

The gas transport laser system in accordance with the present invention preferably uses corona preionization for providing electrical discharge uniformity. Consequently, the difficulties involved with spark preionization are avoided.

The gas transport laser system provided by the present invention has the advantage of achieving high average power lasing action. The gas transport laser system is particularly advantageous when configured as a rare gas monohalide excimer laser for producing coherent radiation in the ultraviolet portion of the spectrum suitable for uses such as laser fusion and laser isotope separation and various semiconductor processes.

SUMMARY OF THE INVENTION

The present invention provides a gas transport laser system which preferably has a polyatomic excimer molecule as a laser medium. Such an excimer molecule is formed in a reaction between atomic particles, which are preferably raised to a metastable state by pulses of electrical energy, and a reactant, which forms a complex with the excited metastable particles, when a third substance interacts therewith to promote the reaction. After formation in the excited state and subsequent emission of radiation, the constituents of the excimer molecule return to their initial species with a minimum of reaction products being accumulated during operation. The laser system is configured so that the gas mixture contacts only materials compatible with the laser gases in order to achieve long-life, closed-cycle operation.

The invention provides a gas transport laser system comprising: a vessel having a cylindrically shaped internal surface; a structure having a cylindrically shaped external surface, the structure having an axis substantially parallel to the axis of the vessel and being positioned within the vessel so as to form a laser chamber between the external surface of the structure and the internal surface of the vessel; means for sealing the structure within the vessel so as to contain a laser gas in the laser chamber; gas recirculating means for flowing the laser gas through the laser chamber in a flow path so as to recirculate the laser gas between the internal surface of the vessel and the external surface of the structure; gas exciting means positioned within the laser chamber at a discharge location for selectively producing a gas discharge; and optically resonant means having an axis substantially parallel to the axis of the vessel and aligned with the discharge location for producing coherent radiation in response to a gas discharge. In another aspect, the invention provides a method for producing coherent radiation comprising the steps of: selecting a gas mixture; containing the selected gas mixture within a laser chamber formed between a cylindrically shaped internal surface of a vessel and a cylindrically shaped external surface of a structure positioned and sealed within the vessel so that the axis of the structure is substantially parallel to the axis of the vessel; flowing the gas mixture through the laser chamber in a flow path so as to recirculate the gas mixture between the internal surface of the vessel and the external surface of the structure; selectively producing a gas discharge within the laser chamber at a discharge location; and disposing a reflective surface and a partially reflective surface in alignment with the discharge location for producing optical feedback for the emitted laser energy.

A high average power, high repetition rate laser system in accordance with the invention includes an elongated sealed cylindrical pressurizable vessel. A gas mixture is contained under pressure in a laser chamber or cavity within the pressurizable vessel. The laser system is preferably pumped or excited by pulsed electrical energy. Electrical energy is preferably applied to two elongated rail electrodes disposed inside the pressurizable vessel which contains the gas mixture. A pulse forming network is positioned within the pressurizable vessel so that the overall inductance of the electrical discharge loop is minimized and does not represent the limiting factor on the rate of current rise. Also, high-inductance feedthroughs through the pressurizable vessel are avoided.

The pressurizable vessel is preferably metal so that the pulse forming network is enclosed in an RFI shielded laser chamber in order to minimize the electromagnetic radiation emanating from the electrical discharge. Since the pulse forming network is shielded, false triggering by external RFI noise sources is prevented. Also, since the pulse forming network is positioned within the pressurizable vessel, feedthroughs through a metal shell are not present, thereby avoiding insulation difficulties.

High pulse rate operation is achieved by virtue of high-speed recirculating gas flow between the rail electrodes. Rotating magnetic shaft seals are preferably used for isolating the laser gas recirculation blower from the blower motor.

The pulse forming network is preferably housed in a dielectric structure eccentrically supported within the pressurizable vessel so that the gas flow path is converging at the location of the rail electrodes, thereby increasing the velocity of the gas flow between the electrodes. Preferably, the rail electrodes are supported in parallel relationship within the pressurizable vessel, forming a gap parallel to the optical axis of the laser system. The rail electrodes are preferably mounted to the dielectric housing of the pulse forming network and electrically connected to the pulse forming network so that the inductance of the electrical discharge loop is minimized.

A source of pulsed electrical energy is connected to the pulse forming network which is in turn connected to the rail electrodes, producing repetitive transverse electrical discharges across the gap. The high voltage pulses applied to the rail electrodes cause electrical discharges to excite rare gas atoms to their metastable state.

Uniform discharge is preferably obtained by preionizing the gas mixture by means of a third electrode, a corona electrode, located near the rail electrodes. The laser medium is preferably preionized immediately prior to each main electrical discharge. A corona discharge rather than a spark preferably provides the preionization so no electrode erosion occurs; no separate energy store, pulse forming components, or delay circuitry is required; and preionization is localized to be only where the main electrical discharge is desired.

Two reflective surfaces, one of which is only partially reflective, are aligned with the optical axis of the laser system, producing an optical resonator for the emitted laser energy. After formation of the polyatomic excimer molecule and subsequent emission of the radiation, the constituents return to their original species.

The electrical discharge preferably excites a gas mixture including a rare gas and reactant, preferably a monohalide, as well as a third substance, to form a polyatomic excimer. The rare gas and halogen reactant are present in much smaller proportion in the gas mixture than is the third substance which is an inert or noble gas. The noble buffer gas is included for aiding electrical discharge uniformity, to provide vibrational relaxation of the laser medium in its electronic state, and to aid in the formation of the excimer molecule. The noble buffer gas can also be used for pressurizing the gas mixture in the laser chamber within the pressurizable vessel. Pressures above atmospheric pressure, and particularly about 60 psig, are presently preferred.

The rare gas which is most preferred is xenon (Xe), preferably to form xenon chloride (XeCl) because of its relatively long life, as well as its wavelength. Other rare gases which are preferred are argon (Ar) and krypton (Kr), particularly Kr to form krypton fluoride (KrF) because of its relatively high power, and also its wavelength. The halogen which is preferred to form the polyatomic excimer molecule with excited state rare gas atoms is preferably a monohalide, such as a chlorine (Cl) monohalide, for example, hydrogen chloride (HCl) to form XeCl. The substance which sustains the gas discharge is inert or noble gas atoms, preferably neon (Ne) or helium (He).

One embodiment of the laser system in accordance with the invention provides a high average power, high repetition rate xenon chloride (XeCl) excimer laser which produces 200 mJ per pulse at a pulse rate of 500 Hz, or 100 W of average output power, at 308 nanometers wavelength. The XeCl embodiment of the invention provides an optical processing source or ultraviolet source facility which has the following characteristics:
Wavelength: 308 nanometers
Energy per pulse: 200 mJ
Repetition rate: 500 Hz
Average output power: 100 W
Pulse duration: 100 nsec
Laser efficiency: >1%
It is reliable, relatively long-lived, and easily maintainable. The critical life components are easily replaced with minimum effort and downtime. The configuration of the laser system in accordance with the invention minimizes the time and cost of maintenance and replacement of components.

BRIEF DESCRIPTION OF THE DRAWINGS

The above and other features and the concomitant advantages of the present invention will be better understood and appreciated by those skilled in the art in view of the following description of the preferred embodiments given in connection with the accompanying drawings. In the drawings:

FIG. 1 is a schematic block diagram illustrating an embodiment of the gas transport laser system in accordance with the invention including a source of electrical excitation energy;

FIG. 2 is an isometric cutaway view of an embodiment of the laser system in accordance with the invention;

FIG. 3 is a cross-sectional view of the laser system of the invention taken along line 3—3 of FIG. 2;

FIG. 4 is a cross-sectional view of the laser system of the invention taken along line 4—4 of FIG. 2;

FIG. 5 is a plot of output power as a function of pulse repetition frequency for an embodiment of the laser system in accordance with the invention; and FIG. 6 is a plot of output power as a function of pulse forming network voltage for an embodiment of the laser system in accordance with the invention.

GENERAL DESCRIPTION

For purposes of explanation of the concept and teaching of the present invention and an understanding of its structure and operation, an embodiment of a gas transport laser system in accordance with the invention employing a polyatomic excimer molecule, such as XeCl, will be described. One requirement for an excimer laser is selecting a technique for efficiently pumping energy in and maintaining a population of excited excimer molecules long enough to extract optical output. This has been achieved with e-beams, e-beam sustained electrical discharges, proton beams, and resonant optical radiation. The laser system in accordance with the present invention preferably uses electrical discharges for forming excited excimer molecules.

Various known high power rare gas monohalide excimer lasers have been implemented with transverse electrical discharge configurations, wherein a spatially uniform high voltage electrical discharge is obtained in a gas mixture at a total pressure of several atmospheres.

The electrical discharge is applied at right angles to the axis of the laser beam through two long parallel electrodes. The discharge gaps generally range from one to five centimeters, and the width of the electrical discharge varies anywhere from a few millimeters to a few centimeters. The electrons produced in the electrical discharge must have characteristic energies of a few electron volts for efficient production of the excited metastable state. Maintaining the electrons at such high energies requires an electrical discharge having certain characteristics.

Electrical discharges are typically described by the ratio of the electric field strength to the gas mixture pressure (E/p). A reasonable value of E/p for transverse electrical discharge is four KV per centimeter per atmosphere of gas. The gas mixture can sustain much higher electric fields than this with no current flowing.

It is extremely difficult, however, to maintain such electric fields for any reasonable duration of time during current flow, when the impedance of the gas mixture drops to its very low characteristic value in a glow discharge. The measured characteristic discharge impedance is one ohm or less.

The nature of emission in the ultraviolet portion of the spectrum requires an electrical power source of the order of one megawatt per $cm^2$ for reasonable optical gain. This consequently requires discharge current densities of several hundred amperes per $cm^2$. The electrical supply must have a low enough impedance to deliver sufficient current into the one-ohm load to maintain a reasonable value of E/p. The high current levels and requirements for high values of E/p can, at present, be obtained only with pulsed electrical discharges, even though, in principle, there is no reason why excimer lasers cannot be run as continuous lasers. The laser system in accordance with the present invention preferably uses pulsed electrical discharges for forming the excited excimer molecules.

Many known excimer lasers operate with a very short pulse and attempt to extract as much energy as possible before the gas discharge internal to the laser mirrors breaks down into an arc and destroys the optical quality and excitation rate of the gas mixture, terminating lasing action. Optical pulse lengths between 10 and 100 nanoseconds are observed with the longer pulse lengths being available only from optimized excimer lasers. The optical output from these excimer lasers ranges from several millijoules to several joules with optical fluences of perhaps 20 megawatts per $cm^2$.

Efficient operation of an excimer laser requires maintaining a high value of E/p during the electrical discharge and maintaining a spatial homogeneity of the gas discharge such that no arcs or streamers form. It is necessary to provide an electric field which exceeds the DC breakdown voltage of the gas mixture by a factor of two to three which translates to 10 to 15 KV per centimeter applied in a time short compared to the characteristic electron avalanche time of 20 or 30 nanoseconds and implies a rise time of greater than a KV per nanosecond. This high voltage discharge is known as the avalanche electrical discharge mode. Here the rate of creation of electrons by the high electric field exceeds the loss rate. The density of electrons in the laser medium then grows until it is limited by the external electrical excitation circuit. This requires a very low impedance electrical excitation circuit to continue to maintain the desired high density without ringing, reversal, or other difficulties. The laser system in accordance with the present invention preferably uses the electrical excitation circuit disclosed in the co-pending patent application of Theodore S. Fahlen and Barton Mass entitled ELECTRICAL EXCITATION CIRCUIT FOR GAS LASERS, U.S. Ser. No. 521,054 filed on Aug. 8, 1983, U.S. Pat. No. 4,549,091, to the same assignee as this application and hereby incorporated by reference herein.

For a given gas mixture, the gas discharge conditions are determined not only by the electrical discharge, but also by the preionization or preconditioning of the gas mixture. The proper preionization is a dominant determinant of the quality of the emission. Initially, the gas mixture has an extremely high impedance with a conductivity determined by the small number of free electrons in the laser gases generated by cosmic rays, radioactive particles in the materials, or photoemission from one of the constituents. This in general leads to a very non-uniform gas discharge when a high voltage is applied and the gas mixture transposes from megohms to ohms impedance. The only successful techniques for obtaining a uniform gas discharge over a large volume require preionizing the gas mixture before the high voltage is applied.

Laser operation improves with increasing amounts of preionization up to some saturation level, and then no further improvement is obtained. The preionizing charge density that must be present when the electrical discharge commences has been found to be approximately $10^6$ per $cm^3$. This preconditioning ideally reduces the impedance of the gas mixture uniformly so that any incipient instabilities or inhomogeneities are delayed and the entire cycle is over before they have grown to measurable size.

Preionization can be effected by a variety of techniques. The earliest excimer lasers used an internal traveling spark discharge for generating short-wavelength ultraviolet, as was historically used on TEA $CO_2$ gas lasers. This preionizing radiation is often obtained from a linear sparkboard which is separately pulsed so that a spark discharge runs rapidly down the length of the excimer laser with a time constant of perhaps several microseconds. The main electrode gap voltage is applied at the peak of the spark intensity. The traveling spark has been somewhat superseded by multiple parallel arcs where a series of 80 to 100 pins are fired simultaneously along the length of the electrode gap, giving rise to more uniform preionization. The major change required for excimer lasers is the use of different fabrication materials to avoid chemical interactions with the uniformity of preionization. The uniformity requirements are severe mainly because excimer lasers can use electronegative halogen donors which tend to allow inhomogeneities to grow catastrophically into thermal arcs. Although a sparkboard can be used for preionizing the gas mixture, the laser system of the present invention preferably uses corona preionization and, alternatively, X-ray preionization.

DETAILED DESCRIPTION OF THE PREFERRED EMBODIMENTS

Referring to FIG. 1, there is shown a laser system which embodies the invention. The laser system is generally indicated by the numeral 10. In FIG. 1, electrical connections are indicated by a single line, fluid connections are represented by double lines, and mechanical connections are indicated by triple lines.

The laser system 10 includes a pressurizable vessel 12. Contained within the pressurizable vessel 12 is an electrode means 14 also included in the laser system 10. The electrode means 14 is electrically connected to a pulse forming network 16 included in the laser system 10 so that the high voltage components are contained within the pressurizable vessel 12 which is preferably metal in order to provide EMI/RFI shielding. This reduces RFI radiated by the laser system 10. The pulse forming network 16 is electrically connected to a charging circuit 18 included in the laser system 10. As shown in FIG. 1, the charging circuit 18 is preferably not contained within the pressurizable vessel 12. The charging circuit 18 is in turn electrically connected to a source of electrical energy 20, which is preferably a direct current (DC) power source. Preionizing means 22 is also included in the laser system 10.

The laser system 10 further includes a gas recirculating means 24. The gas recirculating means 24 is mechanically connected to a drive means 26 also included in the laser system 10. Preferably, as shown in FIG. 1, the drive means 26 is not contained within the pressurizable vessel 12.

Additionally, the laser system 10 includes a heat exchanging means 28 having a fluid connection to a source of coolant 30. The laser system 10 further includes a gas mixture supplying and evacuating means 32 having a gas connection to the interior of the pressurizable vessel 12. The gas mixture supplying and evacuating means 32 can include a gas clean-up means so that continuous operation for an extended period of time can be achieved on one laser gas fill.

FIG. 2 is an isometric, cutaway drawing of the laser system 10, and FIG. 3 is a transverse cross-sectional view of the laser system along line 3—3 shown in FIG. 2. The configuration of the pressurizable vessel 12 preferably incorporates a cylindrical geometry in order to obtain maximum strength with minimum weight, complexity, and cost.

The pressurizable vessel 12 is constructed from a material compatible with the gas mixture for containing a pressurized gas mixture at pressures above atmospheric pressure. The material can be, for example, a metal, such as stainless steel, or fiberglass having a liner or coating impermeable to the gas mixture. The pressurizable vessel 12 preferably comprises a nickel-plated stainless steel cylinder 34 which can be 101.60 centimeters long of circular cross section with an inside diameter of 58.42 centimeters. The stainless steel cylinder 34 preferably has two welded flanges 36 and 38 (76.20 centimeters outside diameter). Each of the flanges 36 and 38 is provided with a circular arcuate groove. An O-ring is disposed in each of the grooves in the flanges 36 and 38. The laser system 10 further includes two end plates 40 and 42 (6.35 centimeters thick and 76.20 centimeters in diameter). Sixteen bolts 44 connect the end plates 40 and 42 to the respective flanges 36 and 38 of the stainless steel cylinder 34 for containing a high pressure gas mixture. This configuration utilizes basic pressure vessel design in order to provide a laser system 10 of relatively compact physical dimensions, low gas volume, few vacuum joints, and high pressure capability.

The gas mixture is contained within a laser chamber inside the pressurizable vessel 12. While maximum efficiency is at a pressure of approximately 60 psig with XeCl as the polyatomic excimer laser medium, the pressurizable vessel 12 is structured to withstand 120 psig internal pressure and has been pressure tested to 180 psig. The total gas volume within the pressurizable vessel 12 is minimal at about 200 liters. The cylindrical length-to-diameter ratio of the pressurizable vessel 12 minimizes the size of the end plates 40 and 42; allows the use of all circular O-rings and grooves for seals; minimizes the overall length; minimizes wasted volume; provides ease of serviceability; and provides a configuration for optimum operation.

The pressurizable vessel 12 contains the electrode means 14, including electrodes 46 and 48; a cylindrical dielectric structure 50 which houses the pulse forming network 16; the preionizing means 22; the gas recirculating means 24, including four tangential blower wheels 52 and gas flow vanes 54; and the heat exchanging means 28. Mounts containing windows 56 and 58 which establish the optical axis of the laser system 10 are located in the end plates 40 and 42 of the pressurizable vessel 12.

The pressurizable vessel 12 contains an electrical discharge structure in the form of the electrode means 14, including a high potential electrode 46 and a grounded electrode 48. The electrodes 46 and 48 are configured to allow either transverse flow between the electrodes (electrode surfaces oriented parallel to the gas flow) or parallel flow through them.

The electrodes 46 and 48 are preferably disposed within the pressurizable vessel 12 as shown in FIGS. 2 and 3 to form a transverse flow configuration in order to optimize optical output. The electrodes 46 and 48 preferably comprise two solid rail electrodes, 79 centimeters long and 3.50 centimeters wide, spaced by 2.5 centimeters. The discharge surfaces of both electrodes 46 and 48 are preferably nickel-plated in the transverse flow configuration. Alternatively, the electrodes 46 and 48 can be rotated 90°. If a 90° rotation of the electrodes 46 and 48 to a flow-through electrode configuration is used, the electrodes are preferably screen electrodes. In the flow-through electrode configuration, the electrodes 46 and 48 preferably are nickel screen of approximately 50% open area stretched flat over a nickel-plated brass rail support structure. A flow-through geometry has several advantages which will be described later. The electrodes 46 and 48 are in close proximity to the pulse forming network 16 in order to reduce the inductance of the electrical discharge loop, thereby increasing the rate of current flow between the electrodes.

In order to increase maintainability and reliability, as well as to decrease the stray inductance between the pulse forming network 16 and the electrodes 46 and 48, the electrodes are preferably mounted directly to the outside of the cylindrical dielectric structure 50 which houses the pulse forming network. Because the high current pulse forming network 16 is contained within the pressurizable vessel 12 which is preferably metal, EMI is suppressed so that false triggering of the laser system 10 is avoided, safety problems are avoided, etc. Also, the pulse forming network - electrode current loop and corresponding electrical discharge loop inductance are very small.

Each of the electrodes 46 and 48 is bolted to eighteen feedthroughs 60 penetrating the cylindrical dielectric structure 50 to the pulse forming network 16. The feedthroughs 60 are O-ring sealed and pass through the cylindrical dielectric structure 50 which houses the pulse forming network 16 for interconnection to the pulse forming network within the pressurizable vessel 12. The electrodes 46 and 48 can be removed without breaking any of the feedthrough seals. Both electrodes 46 and 48 are easily accessible along their entire length, since they can be withdrawn from the pressurizable vessel 12 as will be described later. Each of the electrodes 46 and 48 is adjustable so that the two rails can be made to be parallel to each other.

Transverse gas flow produces disadvantageous boundary layers of stagnant laser gases at the surfaces of the electrodes 46 and 48. This condition can lead to insufficient cathode cooling, a degradation of the preionization electron density (especially in cases where corona preionization is placed behind an electrode), and electrical discharge non-uniformity at the electrode surfaces due to localized gas density variations.

The laser system 10 alternatively includes a flow-through electrode configuration in which the gas mixture passes through screen electrodes parallel to the discharge electric field. The gas flow is through a screen electrode surface, across the electrode gap, and through the screen surface of the other electrode. This flow-through electrode configuration has several advantages. Firstly, the return conductors and associated insulation can be located at least as close to the electrodes 46 and 48 as in a static, no gas flow case. Furthermore, the presence of gas flow across the insulation surfaces can alleviate some of the tracking problems and allow the insulation (and conductor) to be positioned closer to the electrodes 46 and 48 than is possible in the static case. Additionally, the gas velocity can be reduced to provide a clearing ratio of only one. Moreover, the gas mixture heated during one cycle does not bridge the gap between the electrodes 46 and 48 between pulses as it does when flowing perpendicular to the electrical discharge. Furthermore, the boundary layers at the electrodes 46 and 48 are removed by the gas mixture flowing through the electrode surfaces. Also, the cathode, the hotter electrode due to the cathode fall, can be located at the gas input port. This alternative flow-through electrode configuration, then, provides a low inductance electrical discharge loop, eliminates the electrode boundary layer problem, and allows for a clearing ratio of only one, which overcome the factors that the gas flow pressure drop in the region of the electrodes 46 and 48 increases, the gas velocity decreases, and the load on the drive means 26 for the gas recirculating means 24 increases if the flow-through electrode configuration is incorporated. In the flow-through electrode configuration, the electrodes 46 and 48 are in close proximity to the pulse forming network 16 in order to minimize voltage drop due to the electrodes, and the area enclosed within the current loop through the electrodes and pulse forming network is only 50 cm$^2$, with a corresponding inductance of about 9 nh.

The drive means 26 preferably includes two electrical motors 62 and 64 for the four blowers 52. The blowers 52 are preferably ganged (i.e., connected in series) in order to produce an increased gas velocity and flow rate and allow a reduction in the cross-sectional dimension of the blower wheels so that the laser system 10 can be compact. The blower motors 62 and 64 are mounted outside the pressurizable vessel 12 rather than inside since they are more easily serviced, the physical dimensions of the pressurizable vessel can be smaller, and it is virtually impossible to construct a motor compatible with the gas mixture used in excimer lasers. Commercially available industrial duty motors can be used for the blower motors 62 and 64.

Preferably, the blower motors 62 and 64 are connected to the blowers 52 by a drivetrain which includes V-belt drives 66. Different speeds are selected by changing V-belt sheaves. Also, changing to larger or smaller motors 62 and 64 is easy, since they are externally mounted. The V-belt drives 66 reduce the overall length of the laser system 10 (the motors 62 and 64 do not protrude beyond the mounts for the windows 56 and 58) and allow for adjustments in blower speed.

Magnetic couplings 68 are preferably included in the drivetrain between the V-belt drives 66 and the blowers 52 in order to provide a hermetic seal with no mechanical contact to cause wear. Four separate leak-free magnetic couplings 68 are provided for coupling the torque supplied by the blower motors 62 and 64 through the V-belt drives 66 to the blowers 52 in order to reduce the stress to the level acceptable to commercially available couplings. The magnetically coupled shaft feedthroughs markedly increase the reliability of the laser system 10. Bearings are preferably located outside the gas seal in order to avoid corrosion and provide long-life industrial service.

Within the pressurizable vessel 12, the laser system 10 preferably includes bearings with fluorinated lubricants. The blower and coupling bearings inside the pressurizable vessel 12 can be enclosed in a housing which is pressurized with a small flow of halogen-free gas, for example, from a gas clean-up means (not shown). This prevents contamination of the gas mixture by grease or reaction products and protects the bearings from corrosion.

The laser system 10 also includes optically resonant means which provide beam shaping and delivery. Windows 56 and 58 are included in the end plates 40 and 42 of the pressurizable vessel 12. The windows 56 and 58 are 5.08-centimeter diameter plane parallel fused quartz windows forming part of the optical resonator. The windows 56 and 58 are uncoated, but because they are etalons (approximately zero wedge), they are very low loss elements in the optical resonator when aligned perpendicularly to the optical axis. The windows 56 and 58 are easily replaceable, since they are mounted from outside the pressurizable vessel 12 with a threaded ring.

Each of the windows 56 and 58 can be mounted in a gimbal mount so that it can be angularly adjusted to be perpendicular to the laser beam and so that an adjustable internal mirror with no windows can be used. Nickel bellows within the gimbal mounts attached to the end plates 40 and 42 can be included in order to allow the windows 56 and 58 to be adjusted with respect to the optical axis. The bellows and gimbal assemblies included in the window mounting means 70 can be replaced with fixed mounts for fixed titled (6°) windows.

During operation, particulate coating of the internal surfaces of the windows 56 and 58 can contribute to average power losses on the order of several percent. Therefore, particulate control both within the gas flow and window mounting means 70 is desirable. Inside the pressurizable vessel 12, the gas flow vanes 54 preferably direct the gas flow away from the windows 56 and 58, and a port can be provided to flow clean gas mixture over the internal surfaces of the windows in order to eliminate the accumulation of particulate reaction products on the windows.

The optically resonant means includes a maximum reflectivity mirror 74 and a partially transmitting output mirror 76. The mirrors 74 and 76 are separated by 147 centimeters and are mounted in angularly adjustable mounts attached to the window mounting means 70 holding the windows 56 and 58.

The resonant cavity of the laser system 10 is defined between the mirrors 74 and 76. The wavelength for an XeCl polyatomic excimer laser medium has been found to be 308 nanometers (nm). The mirror 74 is slightly curved and can have a radius of curvature of five meters, for example. The mirror 74 is approximately totally reflective at the wavelength of the coherent radiation, which in this example is 308 nm. The mirror 76 can be a flat mirror, for example, which is partially reflective at the wavelength of the coherent radiation produced by the lasing action. The optical axis of the laser system 10 extends between the mirrors 74 and 76 through the laser chamber of the pressurizable vessel 12 and through the partially transmitting mirror 76 where a detector (not shown) can be located in order to measure the optical energy of the coherent radiation emitted from the laser system.

The windows 56 and 58 and the mirrors 74 and 76 can be varied in their configuration and transmission characteristics for optimum transmission of the wavelength of coherent radiation emitted by the laser gases which are used. Optimization of the gas mixture and transmission of the output coupling mirror 76 maximize the optical output power or energy.

In order to detect the wavelength of the coherent radiation, a monochrometer (not shown) can be used. Furthermore, the optical output sensed by the detector can be displayed on an oscilloscope (not shown) after amplification in order to detect the temporal shape of the laser pulse. In the case of the XeCl polyatomic excimer, at full width half maximum (FWHM) the pulse width is tens of nanoseconds as seen through the monochrometer with its wavelength set at the wavelength of the coherent radiation (308 nm).

An inlet and outlet tube 78 with a valve 80 therein is used for introducing and exhausting a gas mixture from the pressurizable vessel 12. The gas mixture supplying and evacuating means 32 includes a gas supply 82, a purge/vacuum pump 84, and a safety vent 86 which reacts to either severe overpressure or an emergency vent command.

The laser system 10 preferably uses a mixture of three gases, each independently introduced into the pressurizable vessel 12. In order to eliminate additional gas handling fittings and thereby increase reliability, a single premixed gas source can be used. In addition, by choosing the latter, the pressure reporting requirements are lessened, and only a gas pressure (psig) gauge and thermocouple tube, or low pressure gauge, are needed.

The purge/vacuum pump 84 allows purging and evacuation of all lines associated with the laser system 10. The purge/vacuum pump 84 preferably incorporates manual valves in all but automatic safety positions for reliability, although remotely activated electric or pneumatic valves for filling and venting/evacuation can be incorporated. The purge/vacuum pump 84 is preferably a commercially available direct drive mechanical pump having a free air capacity of 20 cubic feet per minute. This allows rapid turnaround in typical operation (approximately 15 minutes to a pressure of 50 micrometers Hg or less measured with a thermocouple gauge).

The safety vent 86 preferably comprises a mechanical overpressure relief valve preset to vent the pressurizable vessel 12 automatically in the event of inadvertent overpressure. The safety vent 86 preferably includes a halogen scrubber and vent-line evacuation means.

In the embodiment where a polyatomic excimer molecule is used as the laser medium, polyatomic excimers of Xe are preferred in view of the longer life and wavelength than the polyatomic excimers which are produced from Kr and Ar. Corona preionization is preferably used in the laser system 10. Accordingly, a suitable gas mixture for producing the XeCl polyatomic excimer consists of the gases Ne, Xe, and Cl at a total pressure of about 60 psig or 4000 Torr. The pressurizable vessel 12 is initially evacuated, and then the gas mixture is introduced. This gas mixture can be prepared by mixing approximately 1.2 Torr HCl, approximately 8 Torr Xe, and 4000 Torr Ne. The laser system 10 operates at four to five atmospheres of pressure with Ne as a buffer gas.

X-ray preionization can produce the same optical pulse energy at a lower pressure, and with a gas mixture which replaces some of the heavy neon with lighter helium. This results in a higher gas velocity with no increase in blower motor horsepower.

Contained within the pressurizable vessel 12 is a gas-to-liquid heat exchanger 88 included in the heat exchanging means 28 for removing the approximately 5 to 10 KW of heat deposited in the gas mixture by the electrical discharge across the electrodes 46 and 48, corona preionization, and the blowers 52. The heat exchanger 88 is compact in order to minimize the overall size of the laser system 10. The heat exchanger 88 maintains the gas temperature at 90° F. with 65° F. cooling water flowing at three to four gallons per minute from the coolant source 30. The heat exchanger 88 is preferably a finned tube construction with soldered joints, and the entire heat exchanger is nickel-plated. In order to eliminate water connections inside the pressurizable vessel 12, the feedthrough for the heat exchanger 88 is preferably welded to and passes through a flange 90 which is then sealed to the end plate 42 of the pressurizable vessel with an O-ring.

As shown in FIG. 3, the recirculating gas mixture flows perpendicular to the electric field of the electrical discharge between the electrodes 46 and 48 in the transverse flow configuration. The cylindrical dielectric structure 50 through which the electrodes 46 and 48 are connected to the pulse forming network 16 is eccentrically mounted in (i.e., is not coaxial with) the stainless steel cylinder 34. This provides space for the blowers 52, gas flow vanes 54, and heat exchanger 88 and, importantly, defines an asymmetrical arcuate gas flow path within the pressurizable vessel 12 in the direction indicated by the arrow 92 so that the flow path has a reduced cross-sectional area in the vicinity of the electrodes 46 and 48. This increases the gas velocity at the position of the electrodes 46 and 48, thereby improving the uniformity of the gas discharge. There is minimum head loss in the gas flow path since there are no abrupt changes in direction of flow or flow cross-sectional area as a result of the cylindrical geometry. Furthermore, the cylindrical geometry minimizes the internal surface area for contact with the gas mixture so as to minimize laser gas contamination. The laser system 10 is also more compact and lightweight, as well as lower in cost, as a result of the cylindrical geometry. Moreover, the cylindrical geometry provides a relatively low laser gas volume. Since the laser gases can be expensive, for example, the rare gases in polyatomic excimer gas mixtures, the costs of operation are therefore lower.

In the transverse flow configuration shown in FIG. 3, the gas flow path is structured to make efficient use of space and minimize gas expansion/contraction losses. There are virtually no flow directing devices in the gas discharge region. Additional gas flow vanes 54 can extend the pulse repetition frequencies to higher levels. Expansion and contraction losses are reduced to the point where the only significant losses occur at the electrodes 46 and 48 and the heat exchanger 88. Approximately 90% of the total pressure drop is accounted for in these two areas and is distributed fairly equally between the two. (Slightly less than half of the total pressure drop in the gas flow path is calculated to be at the heat exchanger 88.)

Alternatively, the electrodes 46 and 48 can be rotated 90° so that the recirculating gas mixture flows parallel to the electric field of the electrical discharge; that is, it flows first through the screen electrode 46, across the 2.5-centimeter electrode gap, through the screen electrode 48, around the preionizing means 22, and then is directed back to the heat exchanger 88. The advantages of this flow-through electrode configuration are that the screen electrodes 46 and 48 and preionizing means 22 are better cooled by the flow-through of the gas mixture, boundary layers of laser gases do not form on the electrodes, and the clearing ratio need only be unity. For a given gas velocity, however, the pressure drop is greater in this flow geometry than in the configuration having transverse flow. In the flow-through electrode configuration, the frontal area of the screen in the electrode region is maximized in order to reduce the magnitude of the pressure drop. Nevertheless, the actual pressure drop and blower motor horsepower can be lower because of the reduced gas velocity required due to the lower clearing ratio requirement. The gas flow requires less than one-half the gas velocity than in the transverse flow configuration and a total of about 10 horsepower for driving the blowers 52 at a five atmosphere gas fill with all Ne buffer gas.

Pulses at high voltage with respect to ground, suitably 20 to 50 KV, are applied across the electrodes 46 and 48. The high voltage pulses can be generated by any known pulse circuit which produces short pulses of the order of microseconds in duration. Since, however, the radiative lifetime of excimer molecules is known to be on the order of tens of nanoseconds, the use of a fast rise time, electrical discharge circuit arrangement is imperative. Accordingly, one of the embodiments of the electrical excitation circuit disclosed in the aforementioned co-pending patent application of Theodore S. Fahlen and Barton Mass entitled ELECTRICAL EXCITATION CIRCUIT FOR GAS LASERS incorporated by reference herein is preferably used as the pulse circuit.

The pulse forming network 16 contained within the cylindrical dielectric structure 50 is preferably an LC inversion circuit switched by a magnetic switching means in accordance with the aforementioned Fahlen et al. patent application. Biasing circuitry provides the desired reproducible switching. This configuration has demonstrated overall efficiency and switching characteristics of known thyratron configurations evaluated on the laser system 10.

Two alternative types of capacitance have been incorporated in the pulse forming network 16, namely, a parallel plate, water dielectric capacitance and a discrete strontium-titanate capacitance. Both capacitances are chemically compatible with the cylindrical dielectric structure 50, as well as electrically compatible with the magnetic switching means, and can be easily interchanged. Identical results are obtained with both types of capacitance.

A water dielectric capacitance, however, can have water flow and deionization problems, leading to gas generation and capacitor plate corrosion at high average power operation. Therefore, the pulse forming network 16 preferably includes discrete ceramic capacitors.

All circuit elements included in the pulse forming network 16 within the cylindrical dielectric structure 50 are preferably insulated by a bath of transformer oil. Although the temperature of the magnetic switching means included in the pulse forming network 16 can influence its operation, the effect varies slowly with time. The temperature of the magnetic switching means, as well as the other circuit elements included in the pulse forming network 16, can be controlled by recirculating the insulating oil through an air-cooled heat exchanger 94 as shown in FIG. 2. Oil temperatures encountered in operation are not excessive and have shown no deleterious effect on the circuit elements of the pulse forming network 16.

Load current regulation within less than 0.5% is desired in order to prevent excessive discharge temporal jitter. The operation of the pulse forming network 16 is affected by the regulation of the voltage to which the pulse forming network is charged prior to the electrical discharge. This is controlled by the charging circuit 18 shown in FIG. 1. Electrical connections from the pulse forming network 16 to the charging circuit 18 outside the pressurizable vessel 12 are made by using continuous cables (both coaxial and single conductor) sealed at the air-oil interface by compression O-ring seals.

The charging circuit 18 preferably comprises a cascaded magnetic charging circuit having a silicon controlled rectifier switch in accordance with the aforementioned Fahlen et al. patent application. Alternatively, the charging circuit 18 can include a thyratron switch.

The reproducibility of the charge applied by the charging circuit 18 to the pulse forming network 16 depends in large measure upon the stability of the input voltage to the charging circuit. Using a commercially available switching power supply for the power source 20, voltage regulation of 0.1% can be provided, which achieves the desired temporal stability.

The power source 20 preferably comprises a high voltage switching power supply in order to eliminate the need for bulky and expensive resonant charging components and filter capacitors. The high frequency characteristic of the switching power supply permits good regulation with a small filter capacitor. The switching power supply is well-suited for thyratron applications, because a programmed inhibit time allows thyratron recovery and the inherent current limiting reduces thyratron latching failures. Also, no trickle charge supply for the thyratron is required for one-shot operation.

It is desirable that the gas discharge is uniform and free of arcs. Accordingly, it is desirable that preionization be spatially uniform not only from end to end, but over the entire gap between the electrodes 46 and 48. Preferably, the preionizing means 22 comprises a corona preionizer.

As shown in FIG. 3, one or more quartz-insulated wires are preferably located near the electrode 48 for providing corona preionization for the gas discharge. The resulting discharge volume is about 70×2.5×2 cm$^3$. In this case, a very low energy glow corona discharge is sufficient for preionizing the gas mixture. The corona discharge provides a uniform ion source along the entire length of the electrodes 46 and 48, although the absolute intensity of the corona discharge is near the bottom range of that necessary for good lasing action. Corona boards having large area corona discharges can yield higher optical output.

Preionization besides a corona discharge generating an electron cloud can be used, such as an external ultraviolet source, as well as electron beam or X-ray distributed sources. Alternatively, a sparkboard generating short-wavelength ultraviolet can be used.

Discharge non-uniformity can be reduced by increasing preionization through the use of X-rays. X-ray preionization can increase the active gas discharge volume and uniformity (and therefore efficiency) over that obtained with corona preionization and can reduce arcing. The gas density (more He or reduced total pressure) can be reduced through the use of X-ray preionization, which allows higher gas velocity to be obtained. X-ray preionization can reduce jitter and can also improve output fluence uniformity.

The gas mixture can be preionized by a cold cathode X-ray preionizer located downstream of the gap between the electrodes 46 and 48. The X-ray preionizer requires only one hole to be machined in the end plate 40.

The X-ray preionizer includes inexpensive and easily replaceable components having a lifetime of over 10$^7$ pulses. The X-ray preionizer cathode is preferably carbon felt operating in a vacuum of approximately 10$^{-6}$ Torr. Cooling of the X-ray target is provided by flow of the gas mixture over the X-ray preionizer housing, which is located in the gas flow path downstream of the electrodes 46 and 48.

The X-ray preionizer can be opened to air repeatedly with no poisoning of the cathode (typical in hot cathode devices). The carbon felt can be changed in less than two hours without opening the pressurizable vessel 12. After changing the carbon felt, the laser system 10 can be placed back into operation the following day, since sufficient vacuum can be provided by a diffusion pump and cold trap of adequate capacity to provide a complete pumpdown overnight.

The electrical driver means for the X-ray preionizer is preferably an air core doubly resonant transformer driven by a grounded grid thyratron. The laser system 10 can be provided with two pulses of a nominal 35-volt level separated in time by an adjustable delay of less than one microsecond. These pulses trigger the X-ray preionizer and the main electrical discharge, respectively. Each of the pulses preferably has an adjustable delay with respect to the master trigger pulse in order to allow for any thyratron delay drift.

A sparkboard can be substituted for corona preionization. The energy required for spark preionization is low enough (<1 joule) to result in an acceptable spark electrode lifetime, and the gas flow is adequate for cooling the sparkboard and flushing the spark array. Due to the low energy in each spark, nickel-plated electrodes can be used for the sparkboard.

The gas mixture is fairly strongly absorptive to the ultraviolet generated by a sparkboard. Consequently, there is a strong gradient in preionization level from side to side if the sparkboard is located to one side of the electrodes 46 and 48. This gives rise to a narrow discharge near that same side of the electrodes 46 and 48. This can be corrected, to some extent, by placing sparkboards on each side, or making one of the electrodes 46 and 48 from a screen material and placing the sparkboard behind the screen.

The laser system 10 minimizes contamination of the gas mixture by careful selection of materials so that the formation of particulates is reduced. The materials of construction exposed to the gas mixture are compatible with the laser gases. This approach provides reliable and cost effective particulate elimination so as to avoid particulate-related window damage.

Several materials, including metals and plastics, have been subjected to hot gas mixtures during extended operation of the laser system 10. In general, nickel and nickel finishing have been found to be highly durable. No electrode reliability limitations have been observed. In the transverse flow configuration, nickel plating applied to machined electrode surfaces withstands high average power operation and has survived occasional hard arcs during adjustment of the laser system 10. The nickel screen covering stretched over each of the electrodes 46 and 48 in the flow-through electrode configuration has shown no erosion or corrosion.

Because of their low service temperatures, plastics cannot be used close to hot discharge gases. The configuration of the laser system 10 minimizes the use of dielectric materials in close proximity to the gas discharge. PVC and Teflon (registered trademark) are preferably used as insulating materials in contact with the gas mixture. In order to maximize gas lifetime, the exposed PVC surfaces can be coated with either Teflon or ceramic, especially in the vicinity of the gas discharge. Alternatively, other materials and coating processes can be used.

Controls for the laser system 10 are preferably housed in a single cabinet (not shown). These include controls for the charging circuit 18, power source 20, heat exchanging means 28, and gas mixture supplying and evacuating means 32. The central control console preferably includes display readouts of pertinent measurements such as voltage, current, pressure, and vacuum. A gas mixture recirculation detector is preferably provided and has a display readout on the central control console.

The laser system 10 incorporates a high degree of maintainability by facilitating replacement of critical life components. All components inside the pressurizable vessel 12 are readily accessible. As shown in FIG. 2, a removable cantilevered arm 96 hinged to the flange 38 can support the end plate 42 so that it can be swung away from the flange for easy access to the inside of the stainless steel cylinder 34. It takes only 10 minutes to gain complete access. As shown in FIG. 4, the end plate 40 can be supported by a removable wheeled cradle. The electrode means 14, pulse forming network 16, blowers 52, gas flow vanes 54, and heat exchanger 88 are attached to the end plate 40 and are removed with it as the cradle is rolled away from the stainless steel cylinder 34. This configuration greatly aids removal of the internal components of the laser system 10 from the pressurizable vessel 12 and provides ready access for servicing them. This handling equipment is included in the laser system 10. No additional overhead equipment or forklift is required.

The modular configuration of the laser system 10 minimizes downtime by allowing replacement of component subassemblies as a unit, which is advantageous in a facility using several laser systems. Each subassembly can be removed from the laser system 10 and replaced in less than two hours.

Typical operation of the laser system 10 with the XeCl polyatomic excimer as the laser medium begins with connecting the power source 20 and allowing a nominal 20 minutes for warmup. The laser system 10 can be filled with the gas mixture during the warmup period. All controls and monitors are preferably located on a single panel in the cabinet.

In operation, high voltage pulses are applied from the power source 20 at a rate of approximately 500 Hz after the pressurizable vessel 12 has been filled with the gas mixture so as to produce an XeCl laser medium each pulse cycle. Coherent radiation is emitted at 308 nm. The laser system 10 produces a high average power output with the XeCl laser medium. In excess of 100 W of average output power is produced at a pulse rate of 500 Hz in one embodiment of the laser system 10 which includes a charging circuit 18 having a thyratron and also uses corona preionization. This embodiment has exhibited the performance data shown in Table 1.

TABLE I

| | |
|---|---|
| Output wavelength: | 308 nm (XeCl) |
| Aspect ratio: | 1:1 |
| Windows: | 5.08-centimeter diameter |
| | 6° ± 1° tilt |
| | Nominal 30-centimeter mirror-to-discharge distance |
| RFI shielding: | The configuration lends itself to a double shielded single-point ground system |
| Single pulse: | To 500 Hz |
| Typical operating pressure: | 4000 Torr |
| Average power output: | >100 W |
| Pulse energy (low repetition rate): | >0.350 J/pulse |
| Pulse repetition rate: | 500 Hz |
| Pulse duration (Tp): | ≈100 ns (FWHM) |

FIGS. 5 and 6 show data collected on the laser system 10 for output power as functions of pulse repetition frequency and discharge voltage. FIG. 5 plots the average output power of one embodiment of the laser system 10 as a function of pulse repetition rate, whereas FIG. 6 plots the average output power as a function of the discharge voltage applied by the pulse forming network 16.

The operation of the laser system 10 described above relates to having a charging circuit 18 with a single grounded grid thyratron. Because of the slow switching speed required of the thyratron included in the charging circuit 18, it has proven reliable. Measured values of the pulse width of the thyratron current and peak thyratron current taken during operation at >200 mJ are in good agreement with calculated values. Table II compares the measured values with the ratings for an EG&G HY3202 thyratron with the thyratron operational parameters measured on the laser system 10 (1% wall plug efficiency) with corona preionization.

TABLE II

| | Thyratron Operating Parameters | |
|---|---|---|
| Parameter | HY3202 Rating | Operation (>200 mJ) |
| Maximum Anode Volts | 35 KV | 26.0 KV |
| Peak Current | 120 KA | 3.7 KA |
| Coulomb/Shot | 5 mC | 2.1 mC |

The HY3202 thyratron need only switch about 26 KV and 3.7 KA, which is considerably lower than its 35 KV, 120 KA rating.

The laser system 10 includes long-life, reliable electrical and mechanical components. Furthermore, maximum use is made of off-the-shelf components. This provides the maximum performance and reliability at a reasonable cost. Also, the goal of providing a compact, easily maintainable construction is achieved by the laser system 10.

For purposes of explanation, the operation of laser system in accordance with the invention has been described in terms of an embodiment using the XeCl polyatomic excimer as the laser medium. The concept, teaching, and practice of the invention are not limited, however, to that particular polyatomic excimer laser medium or to polyatomic excimers, but, rather, can be applied to other types of gas laser mediums and pulsed gas transport laser systems, for example, $N_2$ lasers.

Although the transverse gas flow configuration is preferred, alternatives exist for modifying both gas flow geometry and gas velocity for reducing the blower motor horsepower. For example, the electrodes can be reoriented, and gas flow guides can be added. Also, X-ray preionization can allow a lighter gas mixture for higher gas velocity. Other apparatus and other modes of excitation than an electrical pulse discharge, for example, electron beam excitation, can be used.

While various embodiments for a gas transport laser system have been described in order to make the invention understandable to those skilled in the art, it will be appreciated that variations and modifications not mentioned will become apparent to those skilled in the art. It is to be clearly understood that the above description is by way of illustration and example only and is not to be taken by way of limitation. Accordingly, the spirit and scope of this invention are ascertainable only by reference to the appended claims.

What is claimed is:

1. A gas transport laser system, comprising:
   a vessel having a cylindrically shaped internal surface;
   a structure having a cylindrically shaped external surface, the structure having an axis substantially parallel to the axis of the vessel and being positioned within the vessel so as to form a laser chamber between the external surface of the structure and the internal surface of the vessel;
   means for sealing the structure within the vessel so as to contain a laser gas in the laser chamber;
   gas recirculating means for flowing the laser gas through the laser chamber in a flow path so as to recirculate the laser gas between the internal surface of the vessel and the external surface of the structure;
   gas exciting means positioned within the laser chamber at a discharge location for selectively producing a gas discharge; and
   optically resonant means having an axis substantially parallel to the axis of the vessel and aligned with the discharge location for producing coherent radiation in response to a gas discharge.

2. The gas transport laser system of claim 1 wherein the gas exciting means comprises a pair of rail electrodes connected to a pulse forming network energizable from a charging circuit connected to a power source and wherein the vessel is metal for providing EMI/RFI shielding.

3. The gas transport laser system of claim 2 wherein the metal is compatible with the laser gas.

4. The gas transport laser system of claim 3 wherein the metal is stainless steel.

5. The gas transport laser system of claim 4 wherein at least the internal surface of the vessel is nickel-plated.

6. The gas transport laser system of claim 1 wherein the vessel is constructed from a material for containing pressurized laser gas at pressures above atmospheric pressure.

7. The gas transport laser system of claim 6 wherein the material is fiberglass.

8. The gas transport laser system of claim 7, further comprising an impermeable liner forming the internal surface of the vessel for preventing the escape of the laser gas.

9. The gas transport laser system of claim 7, further comprising an impermeable coating forming the internal surface of the vessel for preventing the escape of the laser gas.

10. The gas transport laser system of claim 6 wherein the material is metal.

11. The gas transport laser system of claim 1 wherein the structure is eccentrically positioned within the vessel with the axis of the structure substantially parallel to but not coaxial with the axis of the vessel, the cross-sectional area of the laser chamber perpendicular to the axis of the vessel being reduced at the discharge location for increasing the laser gas velocity at the discharge location.

12. The gas transport laser system of claim 1 wherein the structure is constructed from a dielectric material and wherein the gas exciting means comprises a pair of rail electrodes mounted to the structure at the discharge location and a pulse forming network housed in the structure and connected by feedthroughs through the structure to the rail electrodes for minimizing the inductance of the gas exciting means.

13. The gas transport laser system of claim 12 wherein the pulse forming network is energizable from charging circuit connected to a power source and wherein the vessel is metal for providing EMI/RFI shielding, the pulse forming network being positioned within the vessel so that the feedthroughs to the electrodes do not pass through the metal from which the vessel is constructed.

14. The gas transport laser system of claim 12 wherein one oi the pair of electrodes is positioned with respect to the other electrode of the pair so that the electric field between the electrodes is substantially perpendicular to the flow path at the discharge location for minimizing the pressure drop at the discharge location.

15. The gas transport laser system of claim 12 wherein the electrodes are screen electrodes and wherein one of the pair of electrodes is positioned with respect to the other electrode of the pair so that the electric field between the electrodes is substantially parallel to the flow path at the discharge location for reducing the clearing ratio requirement, avoiding boundary layers of laser gas formed on the electrodes, and providing flow-through cooling of the electrodes.

16. The gas transport laser system of claim 12, further comprising feedthrough seals for sealing the pulse forming network within the structure so as to isolate the pulse forming network from the laser gas, and further comprising means for cooling the pulse forming network.

17. The gas transport laser system of claim 1 wherein the vessel is an elongated cylinder having a first end and a second end and wherein the sealing means comprises a circular groove in at least one of the first and second ends of the vessel, an O-ring disposed in the groove, and a selectively detachable end plate removable for permitting access to the interior of the vessel.

18. The gas transport laser system of claim 1 wherein the gas recirculating means comprises at least one tangential blower disposed within the vessel and means for driving the at least one blower.

19. The gas transport laser system of claim 18 wherein the gas recirculating means comprises a plurality of ganged tangential blowers having a reduced cross section, the plurality of blowers being connected in series for increasing the laser gas velocity and flow rate.

20. The gas transport laser system of claim 19 wherein the means for driving the plurality of blowers comprises a drivetrain including at least one magnetic coupling connected to the blowers and further comprises at least one electric motor mounted external to the vessel and connected to the drivetrain, the at least one motor being energizable from a power source for actuating the blowers, whereby the at least one motor is not exposed to the laser gas.

21. The gas transport laser system of claim 20 wherein the drivetrain further includes at least one V-belt and speed changing sheave connected between the motor and the at least one magnetic coupling, the at least one motor, V-belt, and sheave being changeable for selectively altering the laser gas velocity and flow rate.

22. The gas transport laser system of claim 1 wherein the optically resonant means comprises a pair of spaced apart reflectors forming a resonant cavity for reflecting coherent radiation and end windows transparent to the coherent radiation mounted directly to the vessel.

23. The gas transport laser system of claim 1, further comprising a heat exchanging means in contact with the laser gas for cooling the laser gas.

24. The gas transport laser system of claim 1, further comprising means for preionizing the laser gas at the discharge location prior to the gas discharge.

25. The gas transport laser system of claim 24 wherein the preionizing means comprises a corona preionizer.

26. The gas transport laser system of claim 1 wherein the vessel is an elongated cylinder having a first end and second end and wherein the sealing means includes a selectively detachable end plate removable for permitting access to the interior of the vessel, at least the structure and gas exciting means being secured to the at least one end plate for removal with the end plate.

27. A gas transport laser system, comprising:
a pressurizable vessel having a cylindrically shaped internal surface for minimizing the surface area for contact with a laser gas within the vessel for reducing frictional contact with the laser gas and the area exposed to any corrosive laser gas;

a structure having a cylindrically shaped external surface, the structure having an axis substantially parallel to the axis of the vessel and being positioned within the vessel so as to form a laser chamber between the external surface of the structure and the internal surface of the vessel;

means for sealing the structure within the vessel so as to contain the laser gas in the laser chamber;

gas recirculating means for flowing the laser gas through the laser chamber in a flow path substantially tangential to the external surface of the structure, the flow path having a minimal head loss;

gas exciting means positioned within the laser chamber at a discharge location for selectively producing a gas discharge; and optically resonant means having an axis substantially parallel to the axis of the vessel and aligned with the discharge location for producing coherent radiation in response to a gas discharge.

28. The gas transport laser system of claim 27 wherein the gas exciting means comprises a pair of rail electrodes connected to a pulse forming network energizable from a charging circuit connected to a power source and wherein the vessel is metal for providing EMI/RFI shielding.

29. The gas transport laser system of claim 27 wherein the structure is eccentrically positioned within the vessel with the axis of the structure substantially parallel to but not coaxial with the axis of the vessel, the cross-sectional area of the laser chamber perpendicular to the axis of the vessel being reduced at the discharge location for increasing the laser gas velocity at the discharge location.

30. The gas transport laser system of claim 27 wherein the structure is constructed from a dielectric material and wherein the gas exciting means comprises a pair of rail electrodes mounted to the structure at the discharge location and a pulse forming network housed in the structure and connected by feedthroughs through the structure to the rail electrodes for minimizing the inductance of the gas exciting means.

31. The gas transport laser system of claim 30 wherein the pulse forming network is energizable from a charging circuit connected to a power source and wherein the vessel is metal for providing EMI/RFI shielding, the pulse forming network being positioned within the vessel so that the feedthroughs to the electrodes do not pass through the metal from which the vessel is constructed.

32. The gas transport laser system of claim 30 wherein one of the pair of electrodes is positioned with respect to the other electrode of the pair so that the electric field between the electrodes is substantially perpendicular to the flow path at the discharge location for minimizing the pressure drop at the discharge location.

33. The gas transport laser system of claim 30 wherein the electrodes are screen electrodes and wherein one of the pair of electrodes is positioned with respect to the other electrode of the pair so that the electric field between the electrodes is substantially parallel to the flow path at the discharge location for reducing the clearing ratio requirement, avoiding boundary layers of laser gas formed on the electrodes, and providing flow-through cooling of the electrodes.

34. The gas transport laser system of claim 30, further comprising feedthrough seals for sealing the pulse forming network within the structure so as to isolate the pulse forming network from the laser gas, and further comprising means for cooling the pulse forming network.

35. The gas transport laser system of claim 27 wherein the vessel is an elongated cylinder having a first end and a second end and wherein the sealing means comprises a circular groove in at least one of the first and second ends of the vessel, an O-ring disposed in the groove, and a selectively detachable end plate removable for permitting access to the interior of the vessel.

36. The gas transport laser system of claim 27 wherein the gas recirculating means comprises at least one blower, a drivetrain including at least one magnetic coupling connected to the at least one blower and at least one electric motor mounted external to the vessel and connected to the drivetrain, the at least one motor being energizable from a power source for actuating the at least one blower, whereby the motor is not exposed to the laser gas.

37. The gas transport laser system of claim 36 wherein the drivetrain further includes at least one V-belt and speed changing sheave connected between the motor and the at least one magnetic coupling, the at least one motor, V-belt, and sheave being changeable for selectively altering the laser gas velocity and flow rate.

38. The gas transport laser system of claim 27, further comprising a heat exchanging means in contact with the laser gas for cooling the laser gas.

39. The gas transport laser system of claim 27 wherein the optically resonant means comprises a pair of spaced apart reflectors forming a resonant cavity for reflecting coherent radiation and end windows transparent to the coherent radiation mounted directly to the vessel.

40. The gas transport laser system of claim 27, further comprising a corona preionizer for preionizing the laser gas at the discharge location prior to the gas discharge.

41. The gas transport laser system of claim 27 wherein the vessel is an elongated cylinder having a first end and second end and wherein the sealing means includes a selectively detachable end plate removable for permitting access to the interior of the vessel, at least the structure and gas exciting means being secured to the at least one end plate for removal with the end plate.

42. An excimer laser system for producing coherent radiation, comprising:

a pressurizable vessel having a cylindrically shaped internal surface for minimizing the surface area for contact with a gas mixture consisting of a rare gas and a molecular monohalide gas within the vessel for reducing frictional contact with the gas mixture and the area exposed to the monohalide gas;

a structure having a cylindrically shaped external surface, the structure having an axis substantially parallel to the axis of the vessel so as to form a laser chamber between the external surface of the structure and the internal surface of the vessel;

means for sealing the structure within the vessel so as to contain the gas mixture in the laser chamber;

gas recirculating means for flowing the laser gas through the laser chamber in a flow path substantially tangential to the external surface of the structure, the flow path having a minimal head loss;

gas exciting means positioned within the laser chamber at a discharge location for producing in the laser chamber a laser medium comprising a polyatomic excimer molecule from reaction of the rare gas in a metastable state and the molecular monohalide gas; and optically resonant means having an axis substantially parallel to the axis of the vessel and aligned with the discharge location for producing coherent radiation in response to a gas discharge.

43. The excimer laser system of claim 42 wherein the gas mixture comprises a mixture of the rare gas and molecular monohalide gas and a noble gas, which is of a different species than the rare gas, and the gas exciting means comprises means for applying an electrical pulse to the gas mixture for exciting the rare gas to the metastable state.

44. The excimer laser system of claim 42 wherein the rare gas is Xe and the molecular monohalide gas is HCl.

45. The excimer laser system of claim 43 wherein the rare gas and molecular monohalide gas are maintained under pressure above atmospheric pressure in the laser chamber by the noble gas which is present in the laser chamber in much larger proportion than the rare gas and monohalide gas.

46. A pulsed excimer laser system for producing emitted laser energy by an electrical discharge in a gas mixture and cyclic reformation, comprising:

a pressurizable vessel having a cylindrically shaped internal surface for minimizing the surface area for contact with a gas mixture consisting of a rare gas and a molecular monohalide gas within the vessel for reducing frictional contact with the gas mixture and the area exposed to the monohalide gas;

a structure having a cylindrically shaped external surface, the structure having an axis substantially parallel to the axis of the vessel so as to form a laser chamber between the external surface of the structure and the internal surface of the vessel;

means for sealing the structure within the vessel so as to contain the gas mixture in the laser chamber;

gas recirculating means for flowing the gas mixture through the laser chamber in a flow path substantially tangential to the external surface of the structure, the flow path having a minimal head loss;

first and second electrodes supported within the vessel for forming a gap therebetween;

a source of pulsed electrical power connected to the electrodes for producing an electrical discharge across the gap at pressures optimized for lasing action for producing in the laser chamber a laser medium comprising a polyatomic excimer molecule consisting of the rare gas in a metastable state and the halogen of the molecular monohalide gas;

a buffer gas contained within the vessel and selected for aiding electrical discharge uniformity and aiding in the excitation of the gas mixture and to provide vibrational relaxation of the laser medium in its electronic state;

means disposed within the vessel for preionizing the gas mixture within the vessel immediately prior to the electrical discharge produced by the source of pulsed electrical power; and at least two reflective surfaces disposed and aligned relative to the vessel for producing optical feedback for the emitted laser energy.

47. The pulsed excimer laser system of claim 46 wherein the reflective surfaces are supported on end plate windows mounted directly to the vessel.

48. The pulsed excimer laser system of claim 46 wherein the rare gas is Xe, the molecular monohalide gas is HCl, and the buffer gas is chosen from among the group consisting of He and Ne.

49. A method for producing coherent radiation, comprising the steps of:

selecting a gas mixture;

forming a laser chamber between a cylindrically shaped internal surface of a vessel and a cylindrically shaped external surface of a structure positioned and sealed within the vessel so that the axis of the structure is substantially parallel to the axis of the vessel;

containing the selected gas mixture in the laser chamber;

flowing the gas mixture through the laser chamber in a flow path so as to recirculate the gas mixture between the internal surface of the vessel and the external surface of the structure;

selectively producing a gas discharge within the laser chamber at a discharge location; and disposing a reflective surface and a partially reflective surface in alignment with the discharge location for producing optical feedback for the emitted laser energy.

50. The method of claim 49 wherein the step of selectively producing a gas discharge within the laser chamber at the discharge location comprises pulsing electrical discharges between a pair of electrodes positioned within the laser chamber at the discharge location.

51. The method of claim 49, further comprising the step of cooling the selected gas mixture during recirculation.

52. The method of claim 49, further comprising the step of preionizing the gas mixture at the discharge location immediately prior to producing periodic gas discharges within the laser chamber at the discharge location.

* * * * *

UNITED STATES PATENT OFFICE
CERTIFICATE OF CORRECTION

Patent No. 4,611,327              Dated  September 9, 1986

Inventor(s)  David J. Clark and Theodore S. Fahlen

It is certified that error appears in the above-identified patent and that said Letters Patent is hereby corrected as shown below:

Column 9, line 41, "oompatible" should read --compatible--.

Column 21, lines 48 & 49, "from charging" should read --from a charging--.

Column 21, line 56, "one oi" should read --one of--.

Signed and Sealed this

Fourth Day of July, 1989

Attest:

DONALD J. QUIGG

Attesting Officer

Commissioner of Patents and Trademarks